US 8,880,554 B2

(12) United States Patent
Kumar et al.

(10) Patent No.: US 8,880,554 B2
(45) Date of Patent: Nov. 4, 2014

(54) METHOD AND APPARATUS FOR HIGH PERFORMANCE, UPDATABLE, AND DETERMINISTIC HASH TABLE FOR NETWORK EQUIPMENT

(75) Inventors: Sailesh Kumar, San Jose, CA (US); Zhenxiao Liu, Shenzhen (CN); William Lynch, Los Altos, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/248,235

(22) Filed: Sep. 29, 2011

(65) Prior Publication Data
US 2012/0143877 A1    Jun. 7, 2012

Related U.S. Application Data

(60) Provisional application No. 61/419,580, filed on Dec. 3, 2010.

(51) Int. Cl.
  *G06F 17/30* (2006.01)
  *H04L 12/741* (2013.01)
(52) U.S. Cl.
  CPC ........ *G06F 17/30949* (2013.01); *H04L 45/745* (2014.01)
  USPC ....................................... 707/790
(58) Field of Classification Search
  USPC ....................................... 707/790
  See application file for complete search history.

(56) References Cited

U.S. PATENT DOCUMENTS

| 6,775,281 | B1 | 8/2004 | Brown |
| 6,862,287 | B2 | 3/2005 | Brown |
| 7,990,958 | B2* | 8/2011 | Brown .......................... 370/389 |
| 2004/0255045 | A1 | 12/2004 | Lim et al. |
| 2007/0286194 | A1 | 12/2007 | Shavitt et al. |
| 2010/0011028 | A1 | 1/2010 | Dade |
| 2010/0036820 | A1 | 2/2010 | Stergiou et al. |
| 2010/0254378 | A1 | 10/2010 | Akella et al. |
| 2011/0246503 | A1* | 10/2011 | Bender et al. ................. 707/769 |

FOREIGN PATENT DOCUMENTS

| CN | 1377543 A | 10/2002 |
| CN | 1889080 A | 1/2007 |

OTHER PUBLICATIONS

Foreign Communication From a Related Counterpart Application, PCT Application PCT/CN2011/082497, International Search Report dated Mar. 1, 2012, 4 pages.

(Continued)

*Primary Examiner* — Amresh Singh
(74) *Attorney, Agent, or Firm* — Conley Rose, P.C.; Grant Rodolph; Brandt D. Howell

(57) ABSTRACT

An apparatus comprising a storage device comprising a hash table including a plurality of buckets, each bucket being capable of storing at least one data item, and a processor configured to apply at least a first and a second hash function upon receiving a key to generate a first index and a second index, respectively, the first and second indices identifying first and second potential buckets in the hash table for storing a new data item associated with the key, determine whether at least one of the first and second potential buckets have space available to store the new data item, and responsive to determining that at least one of the first and second potential buckets have available space, insert the new data item into one of the first or second potential buckets determined to have available space.

10 Claims, 7 Drawing Sheets

(56) References Cited

OTHER PUBLICATIONS

Foreign Communication From a Related Counterpart Application, PCT Application PCT/CN2011/082497, Written Opinion dated Mar. 1, 2012, 7 pages.

Foreign Communication From a Counterpart Application, European Application No. 11845696.1, Extended European Search Report dated Jan. 22, 2014, 6 pages.

* cited by examiner

METHOD AND APPARATUS FOR HIGH PERFORMANCE, UPDATABLE, AND DETERMINISTIC HASH TABLE FOR NETWORK EQUIPMENT

CROSS-REFERENCE TO RELATED APPLICATIONS

The present application claims the benefit of U.S. Provisional Patent Application No. 61/419,580 filed Dec. 3, 2010 by Sailesh Kumar et al. and entitled "Method and Apparatus for High Performance, Updatable, and Deterministic Hash Table for Network Equipment," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Current Internet Protocol (IP) networks may comprise a plurality of nodes, including a plurality of routers at the core of the network and a plurality of hosts at the edge of the network. The routers collectively link the communication channels between hosts. The nodes are assigned network-wide unique IP addresses to enable proper and efficient traffic forwarding to destination nodes. The routers may route packets in the IP networks based on the IP addresses carried in the packets. The packets may be forwarded by the routers to proper destinations based on a <source address, destination address> pair, which may be indicated in each packet.

Many high-speed packet switching networks use lookup operations to match a value or a set of values against a table of entries. For example, IP routing operations commonly apply longest prefix match (LPM) comparison techniques to perform forwarding table look-ups. Thus, the routers may utilize data structures such as forwarding tables to perform one or more lookup operations on packets. Upon receiving a packet, a router may refer to a forwarding table and use a network address (e.g., an IP address prefix) of the received packet as a key. For instance, the router may use the forwarding table to look up a packet's destination address and select an output port associated with that address. If a match is not found, then the packet may be flooded (e.g., forwarded over various ports) or discarded.

Lookup and update operations are commonly used with hash tables in which data values are indexed based on the result of a hash function that may be applied to the corresponding keys for the data values. Application of the hash function generates an index to a location or "bucket" of the hash table. Each bucket of the hash table may include a fixed number of entries for storing data values with keys that "hash" to the same index. The keys and data values may be stored in and retrieved from the bucket corresponding with the index produced by applying the hash function to the key.

One benefit of using a data structure such as a hash table is that the lookup time to locate a value associated with a key is generally constant regardless of the number of data values in the hash table. Therefore, a hash table implementation may remain efficient even when the number of data values stored in the buckets becomes considerably large. On the other hand, an issue that commonly arises when using hash functions with lookup tables is that collisions are practically unavoidable. A collision may occur when a hash function produces the same index for two or more distinct keys, in which case an attempt to insert a data item in the same location as an existing item value might be blocked. Thus, unlike fully-associative data structures such as content addressable memories (CAMs), conventional hash tables may not guarantee deterministic lookups.

Therefore, one or more techniques might be needed to resolve collisions so that a unique index can be generated from each key (e.g., packet address). One technique used in such cases involves linking each position or slot of the bucket to a list containing the key-value pairs hashed to the same location. Another technique includes increasing the size of each bucket to accommodate multiple data values. However, such techniques are known to be costly in terms of memory bandwidth requirements and processing time. Additionally, many of these techniques utilize special circuitry known to be relatively expensive and complicated.

SUMMARY

In one embodiment, the disclosure includes an apparatus comprising a storage device comprising a hash table including a plurality of buckets, each bucket being capable of storing at least one data item, and a processor configured to apply at least a first and a second hash function upon receiving a key to generate a first index and a second index, respectively, the first and second indices identifying first and second potential buckets in the hash table for storing a new data item associated with the key, determine whether at least one of the first and second potential buckets have space available to store the new data item, and responsive to determining that at least one of the first and second potential buckets have available space, insert the new data item into one of the first or second potential buckets determined to have available space.

In another embodiment, the disclosure includes a network apparatus implemented method for storing data into a hash table and implemented by at least one network component, the method comprising receiving a first key, applying, with a processor, a first hash function to the first key to generate a first index, the first index identifying a first potential bucket in the hash table for storing a new data item associated with the first key, applying, with a processor, a second hash function to the first key to generate a second index, the second index identifying a second potential bucket in the hash table for storing the new data item, determining, with a processor, whether at least one of the first and second potential buckets have space available to store the new data item, and responsive to determining that at least one of the first and second potential buckets have available space, inserting the new data item into one of the first or second potential buckets determined to have available space.

In a third aspect, the disclosure includes an apparatus comprising a storage device comprising a plurality of buckets, each bucket configured with capacity to store at least one data item, and a processor configured to identify first and second buckets for storing a new data item based on a key associated with the new data item, the processor further configured to determine whether at least one of the first and second potential buckets have space available to store the new data item, and the processor further configured to determine whether at least one of a plurality of alternative buckets has space available to store a data item currently stored in one of the first or second potential buckets when both of the first and second potential buckets are full, wherein the plurality of alternative buckets are arranged in a hierarchical tree structure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figures 1A, 1B:
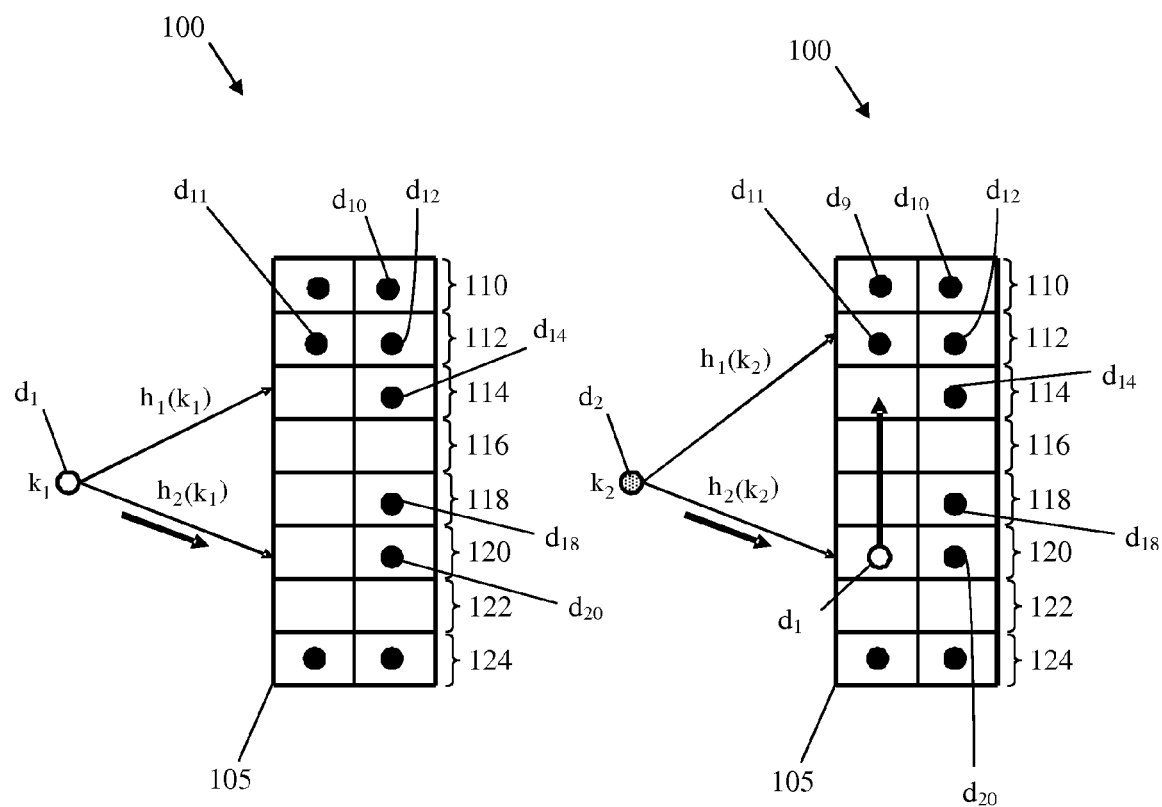
FIGS. 1A and 1B are schematic diagrams of a hash table according to an embodiment of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Table lookup and update operations may both require a substantially deterministic performance guarantees. In many network systems, however, lookup operations tend to require relatively higher performance. To leverage these requirements, aspects of the present disclosure propose performing a bounded number of movements within a hash table during insert operations, such that the hash table may be rebalanced while maintaining relatively high throughput during lookup operations. Due to the bounded number of movements, update operations may maintain substantially deterministic properties, thereby ensuring deterministic hash table performance. While bounding the number of movements may potentially decrease the insert rate, the bounded number may be selected to ensure that the insert rate remains sufficient for a given network protocol to operate correctly.

Moreover, aspects of the present disclosure may utilize one or more multi-bucket hashing techniques to reduce collisions. One such technique is known as a d-left hashing, wherein a hash table may be partitioned into d sections, such that a new data item may be inserted into a least loaded bucket or, in case of a tie, into the left-most bucket. Additionally or alternatively, some aspects include storing multiple data items per bucket to reduce collisions and leverage the burst access properties of common memory technologies in router line cards. In sum, embodiments of the present disclosure provide a balance between various constraints as described above (e.g., memory bandwidth, access size, storage capacity, lookup rates, update rates, etc.) to obtain a relatively economical and efficient design that satisfies the levels of performance required in high-end network equipments.

Disclosed herein is a system and method of implementing a substantially deterministic hash table. During insert operations, at least a first hash function and a second hash function are applied to a key to generate a first and second index value, respectively. The first and second index values are used to identify a first potential bucket and a second potential bucket for storing a new data item associated with the key. If neither the first nor the second bucket has space available to store the new data item, a search may be conducted to determine whether an alternative bucket is available for storing a data item currently located within the first or second potential bucket. If an available bucket is found for a data item located in either the first bucket or the second bucket, that data item may be moved to the alternative bucket, thereby making room to insert the new data item into the bucket from which the data item was moved.

Referring now to FIG. 1A, a hash table 100 according to an embodiment of the present disclosure is illustrated and represented as an array of m rows and c columns. As used herein, the term "hash table" may refer to any suitable data structure, array, set, cache, or suitable memory device that stores data and associates keys with data values or respective table locations. Those of ordinary skill in the art will understand that the hash table 100 may be used by one or more suitable network components and infrastructure elements, such as, but not limited to, routers, switches, servers, etc. Moreover, the hash table 100 may comprise and/or be implemented via any suitable storage media 105 such as, but not limited to, Random Access Memory (RAM), Dynamic RAM (DRAM), Synchronous DRAM (SDRAM), Reduced Latency DRAM (RLDRAM), embedded DRAM (eDRAM), Temporary Content Addressable Memory (TCAM), Phase-Change Memory (PCM), Solid State Drive (SSD), Hard Disk Drive (HDD), Phase-Change Memory (PCM), etc.

The hash table 100 comprises a plurality of buckets 110, 112, 114, 116, 118, 120, 122, and 124 for storing data. As used herein, the term data is intended in its broadest sense and may refer to packets of all types or any other units of information or data, including, but not limited to, fixed length cells and variable length packets, each of which may or may not be divisible into smaller packets or cells. In addition, the term "packet" may refer to both the packet itself or a portion thereof, such as, but not limited to all or part of a packet header, a data structure value, pointer or index, or any other direct or indirect identification of a packet or information associated therewith. Furthermore, packets may contain one or more types of information, including, but not limited to, audio, voice, and video information.

In some embodiments, the buckets 110, 112, 114, 116, 118, 120, 122, and 124 may accommodate multiple slots or entries, where each entry may include a key or a data item associated with the key. For instance, each entry may be a fixed-length (e.g., 32-bit) pointer to a specific location in a master file containing stored items. In FIG. 1A, the rows of the hash table 100 correspond to the number of buckets (i.e., m buckets), and the columns correspond to the number of entries in each bucket (i.e., c entries per bucket). Thus, the hash table 100 of FIG. 1 will be described herein as comprising eight buckets 110, 112, 114, 116, 118, 120, 122, and 124 containing two entries each. Nonetheless, it is to be understood that in other implementations, the hash table 100 may comprise more or less buckets, and each bucket may contain any suitable number of entries. Similarly, while the buckets 110, 112, 114, 116, 118, 120, 122, and 124 will be described as containing an equal number of entries, in some implementations one or more buckets may contain more or less entries than other buckets in the hash table 100.

In an embodiment, at least two hash functions are used to generate an index corresponding to a respective bucket 110, 112, 114, 116, 118, 120, 122, and 124. As used herein, the term "hash function" may refer to any suitable function or mapping algorithm that uses an input value such as a key and returns or identifies an output value or index associated with a location (e.g., a bucket or entry thereof) in the hash table 100. It is to be understood that while embodiments described herein may focus on the use of a particular number of hash functions, other embodiments may utilize any suitable number of hash functions.

According to one aspect, a first hash function $h_1$ and a second hash function $h_2$ receive and process newly arrived keys k to generate respective outputs identifying potential buckets 110, 112, 114, 116, 118, 120, 122, and 124 in connection with accessing and/or storing data (e.g., during insert and/or update operations) associated with the key. For convenience, such data will herein refer to a data item associated with the key. However, skilled artisans will readily appreciate that the data may additionally or alternatively include the key itself, all or part of a data item associated with the key, location information or a pointer identifying all or part of the data item, etc.

As shown in FIG. 1A, the first and second hash functions $h_1$ and $h_2$ may each be applied to a first key $k_1$ to generate an output identifying a first bucket 114 and a second potential bucket 120, respectively. In an embodiment, each of the identified buckets 114 and 120 may serve as a prospective candidate for storing a data item $d_1$ associated with the first key $k_1$. Thus, either or both of the buckets 114 and 120 may be examined to determine whether the data item $d_1$ may be inserted therein. In this case, although both buckets 114 and 120 contain an existing data item $d_{14}$ and $d_{20}$, respectively, both buckets 114 and 120 contain an entry available for storing an additional data item. Assuming that the data items $d_{14}$ and $d_{20}$ existing in the respective buckets 114 and 120 are of the same size and that each bucket 114 and 120 is of the same capacity, either of the two buckets 114 or 120 may be selected to insert the data item $d_1$ associated with the first key $k_1$.

Those of ordinary skill in the art will understand that a bucket 114 or 120 for storing the data item $d_1$ may be selected in various ways. Briefly, selection of a bucket may be done randomly, sequentially, and/or according to a specified policy or preference (e.g., based on most or least recently used). In one aspect, for example, a bucket may be selected based on an amount of capacity available or an occupancy level. Additionally or alternatively, a bucket may be selected based on the type of data to be inserted into a bucket. For purposes of describing the present example, however, it may be assumed that bucket 120 is arbitrarily selected for inserting the data item $d_1$ associated with the first key $k_1$.

Referring now to FIG. 1B, a second key $k_2$ is shown as being applied as a function of the first and second hash functions $h_1$ and $h_2$. Here, the first and second hash functions $h_1$ and $h_2$ return respective outputs identifying a first bucket 112 and a second bucket 120 as potential candidates for storing a data item $d_2$ associated with the second key $k_2$. As shown in FIG. 1B, the first identified bucket 112 contains two data items $d_{11}$ and $d_{12}$, and the second identified bucket 120 contains two data items $d_1$ and $d_{20}$. Thus, unlike the case described with respect to FIG. 1A, both of the identified buckets 112 and 120 are full. Since the buckets 112 and 120 identified by the hash functions $h_1$ and $h_2$ do not have space available for storing the data item $d_2$ associated with the second key $k_2$, a search may be performed to determine whether an alternative bucket may be employed to make room for accommodating the data item $d_2$ within the hash table 100.

For example, one or more other buckets (i.e., buckets not identified by hash functions $h_1$ and $h_2$) may be searched to determine whether an existing data item $d_1$, $d_{11}$, $d_{12}$, or $d_{20}$ may be moved from one of the identified buckets 112 or 120 into an alternative bucket. According to one aspect, the search for an alternative bucket may first be performed for the data items stored in the buckets identified by the first and second hash functions $h_1$ and $h_2$. As such, the search may begin by examining the potential buckets identified during the process of inserting the existing data items $d_1$, $d_{11}$, $d_{12}$, or $d_{20}$ into the buckets 112 and 120 identified as candidates for inserting $d_2$. Those versed in the art will appreciate that the order in which buckets are examined may be based on any suitable criteria. For instance, the order may be predetermined or random, based upon bucket location, based upon time (e.g., most recently added or moved data item into a bucket). In some aspects, buckets may be searched in a depth-first order, whereas in other aspects buckets may be searched in a breadth-firth order. For the sake of clarity only, the present example will assume that alternative buckets are searched in a breadth-first order beginning with data item $d_1$.

As discussed above, the first and second hash functions $h_1$ and $h_2$ generated output values identifying two buckets 114 and 120 as possible candidates for inserting data item $d_1$. Since bucket 120 was selected to store data item $d_1$, the unselected bucket 114 may be defined as the "alternative bucket" to be examined in this case. Therefore, although a certain bucket (e.g., bucket 114) may not be originally selected to insert a data item (e.g., $d_1$), the hash table 100 may maintain a log of output values corresponding to the alternative buckets that were originally identified but not used to store a respective data item. Alternatively, when a data item is stored in the bucket selected at the time of insertion, an output value corresponding to the alternative bucket may be stored along with each respective data item.

As shown in FIG. 1B, the alternative bucket 114 for data item $d_1$ has an entry available for accommodating an additional data item. Thus, data item $d_1$ may be moved from bucket 120 to its alternative bucket 114, thereby allowing room for inserting data item $d_2$ into bucket 120. Of course, if three or more hash functions had been used to identify buckets for inserting data item $d_1$, then each unselected bucket that was identified may be defined as an alternative bucket for data item $d_1$. If multiple alternative buckets are examined and determined to be available in such cases, the alternative buckets that are available may be compared to determine (e.g., based on occupancy level) which of the alternative buckets to select for moving the data item in question to.

In some aspects, multiple alternative buckets for a given data item, and/or for at least two data items, may be examined to determine whether an existing data item may be moved to make room for a newly arrived data item. Alternatively, examination may terminate upon identifying the first alternative bucket having space available for a given data item. In other aspects, at least one alternative bucket for each data item currently stored in a bucket identified as a potential candidate for storing a newly arrived data item may be examined. If more than one alternative bucket is determined to contain an available entry for accommodating a data item in an identified bucket, each alternative bucket available may be compared to determine which bucket is to be used. As discussed above, bucket selection may be done randomly, sequentially, per policy, etc.

In one example, it may be assumed that hash functions $h_1$ and $h_2$ produced output values identifying buckets 112 and 116 as potential buckets during the insertion of data item $d_{11}$. Since data item $d_{11}$ is currently stored in bucket 112, bucket 116 is defined as an alternative bucket that may be examined upon determining whether data item $d_{11}$ can be moved to make room for inserting data item $d_2$ into bucket 112. As shown in FIG. 2B, bucket 116 is empty, whereas bucket 114 contains a data item $d_{14}$. In some cases, therefore (e.g., depending on the algorithm or preference for arranging data items within the hash table 100), to make room for inserting data item$_{d2}$, data item $d_{11}$ may be moved from bucket 112 to bucket 116 instead of moving data item $d_1$ from bucket 120 to bucket 114. In this case, data item $d_2$ would be inserted into bucket 112 instead of into bucket 120. For instance, this result might be preferred if bucket selection is based on a lowest occupancy level.

In another example, it may be assumed that none of the four alternative buckets have available space for storing the corresponding data item located in the buckets 112 and 120 identified for data item $d_2$. In this case, up to eight alternative buckets may be similarly examined to determine whether a bucket has space available to store a data item located in one of the four alternative buckets that are full. Based on the assumption that none of the four data items $d_1$, $d_{11}$, $d_{12}$, and $d_{20}$ can be moved into their respective alternative bucket, a search may be conducted to identify a potential alternative bucket for a data item located in one of the four alternative buckets that is full.

According to one aspect, upon identifying an alternative bucket that is not full (or is otherwise capable of storing a data item), data items may be moved iteratively in the order of examination beginning with the data item whose alternative bucket is not full, and ending with inserting the newly arrived data into one of the two identified buckets. This aspect will be described further with reference to FIG. 2, which illustrates a decision tree 200 for arranging data items in a hash table.

Figure 2:
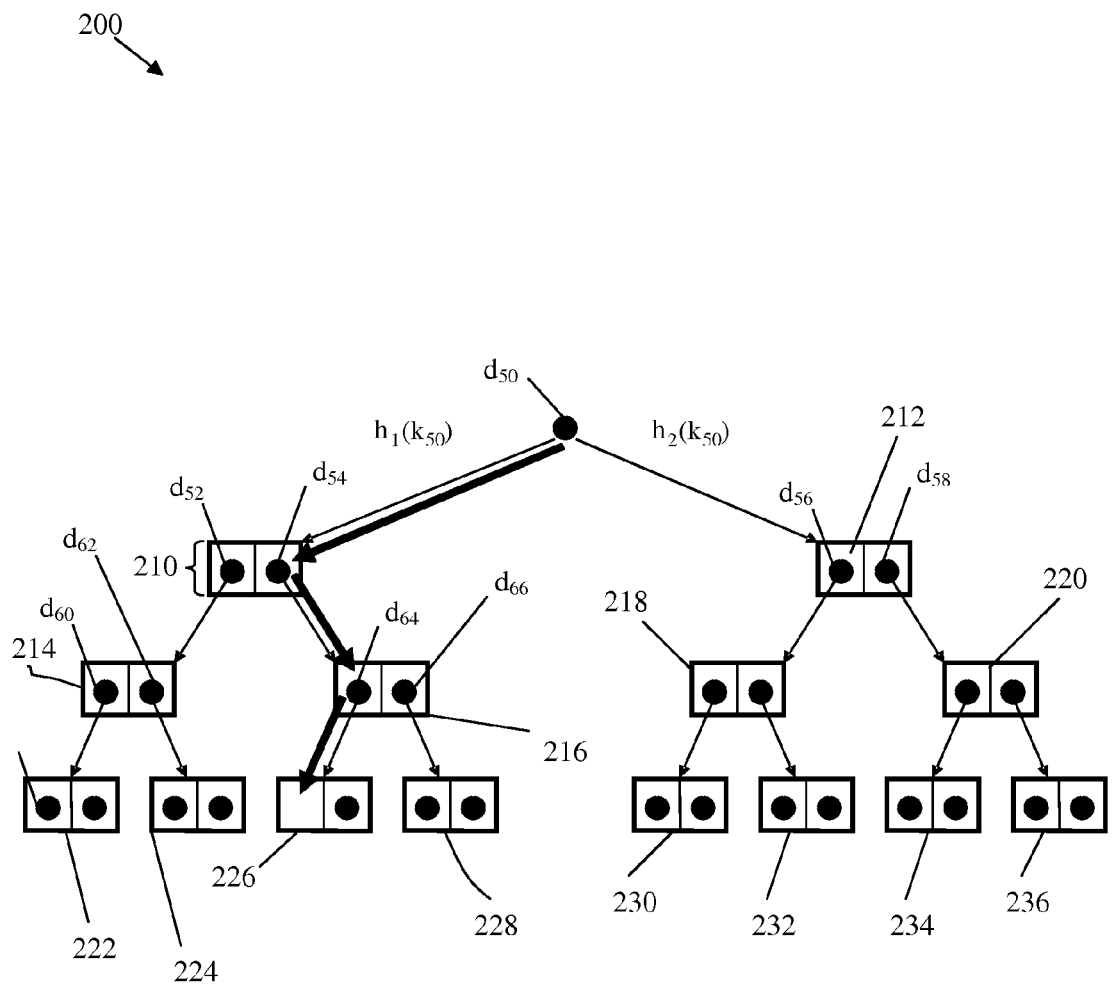
FIG. 2 is a schematic diagram of a decision tree according to an embodiment of the present disclosure.

During insert operations, the decision tree 200 may be used to search for alternative buckets in a hash table such as that shown in FIGS. 1A and 1B. In an embodiment, the decision tree 200 may take the form of a binary tree rooted at each of the buckets identified as potential candidates for inserting a data item. In implementations where two hash functions (e.g., $h_1$ and $h_2$) are used to insert data items into buckets, each bucket that is full (i.e., contains c data items) will have a total of c alternative bucket choices in which one of its c data items may be moved to. Consequently, the degree of the decision tree 200 depicted in FIG. 2 is equal to c.

Upon receiving a newly arrived data item $d_{50}$, a first hash function $h_1$ and a second hash function $h_2$ may be applied to generate output values identifying a first and second respective bucket 210 and 212, where each bucket 210 and 212 may be viewed as corresponding to a first or top level of the decision tree 200. Since each of the identified buckets 210 and 212 is full, the hash table may be searched to determine whether a data item $d_{52}$, $d_{54}$, $d_{56}$, $d_{58}$ may be moved from a top bucket 210 or 212 to an alternative bucket located at a lower level of the decision tree 200.

For purposes of convenience, the decision tree 200 will be described beginning with a search of an alternative bucket to move data item $d_{52}$. Moreover, it will be assumed that two hash functions (e.g., $h_1$ and $h_2$) were used to identify two potential buckets for storing each data item in the buckets shown in FIG. 2, where one potential bucket corresponds to the bucket in which a given data is currently stored, and the other corresponds to an alternative bucket that was identified by a hash function but not selected to store that given data item. In FIG. 2, for example, the alternative bucket for data item $d_{52}$ corresponds to bucket 214, which is full. Since an alternative bucket is not available for data item $d_{52}$, the decision tree 200 may be used to determine whether an alternative bucket is available for the next data item (e.g., $d_{54}$, $d_{56}$, or $d_{58}$) to be searched. As previously mentioned, a search for an alternative bucket may continue until an available alternative bucket is found.

In an embodiment, if an alternative bucket is not available for any of the data items $d_{52}$, $d_{54}$, $d_{56}$, or $d_{58}$ located in the top or first level buckets 210 and 212, the search may proceed to determine whether an alternative bucket is available for one or more data items located in the next level of the decision tree 200. For the sake of clarity, it will be assumed that buckets are searched sequentially in this case. Thus, the search at the next level may begin by determining whether an alternative bucket is available for a data item (e.g., $d_{60}$ or $d_{62}$) located in bucket 214. In other cases, however, the search at the next level may begin with determining whether an alternative bucket is available for one or more data items located in a different bucket (e.g., bucket 216, 218, and/or 220). In this regard, it is noted that the order in which alternative buckets may be based according to any suitable search algorithm.

As shown by the decision tree 200, the respective alternative buckets 222 and 224 for the data items $d_{60}$ or $d_{62}$ located in bucket 214 are both full. In some aspects, upon determining that a first data item (e.g., $d_{60}$) in bucket 214 cannot be moved to its alternative bucket, the search may proceed to determine whether the other data item (e.g., $d_{62}$) in bucket 214 can be moved to its alternative bucket. In other aspects, upon determining that one of the two data items $d_{60}$ or $d_{62}$ in bucket 214 cannot be moved to its alternative bucket 222 or 224, respectively, the search may proceed to determine whether one or more data items located in a different bucket 216, 218, or 220 can be moved to an alternative bucket.

Irrespective of the order in which alternative buckets for data items located in buckets 214, 216, 218, and 220 are searched, the search may continue until an available alternative bucket is found. At some point, therefore, a search will be performed to determine whether an alternative bucket is available for data item $d_{64}$. According to the decision tree 200, bucket 226 corresponds to the alternative bucket for data item $d_{64}$. Since bucket 226 is shown as having an open entry, data $d_{64}$ may be moved from bucket 216 into its alternative bucket 226. Subsequently, data items located in buckets at the upper levels may be moved to their alternative buckets so that space may be created for inserting data item $d_{50}$ into one of the identified buckets 212 or 214. In this case, for example, after data item $d_{64}$ is moved into bucket 226, data item $d_{54}$ may be moved into bucket 216, and data item $d_{50}$ may be inserted into bucket 212. Assuming that the hash table in question does not have any additional buckets, the hash table will be at full capacity upon insertion of data item $d_{50}$. However, if the hash table does have additional buckets that are not full, such buckets may be searched in a manner similar to that described in order to determine whether an alternative bucket is available for moving one or more data items located in buckets 222, 224, 226, 228, 230, 232, 234, and/or 236.

In an embodiment, a limited or bounded number of search iterations equal to k may be imposed during insert operations. For instance, to make room for inserting a newly arrived data item, the total number of data items that may be moved must be less than or equal to k. In the example depicted in FIG. 2, an available alternative bucket (i.e., bucket 226) was identified after two search iterations, and therefore, two data items (i.e., $d_{54}$ and $d_{64}$) were moved to make room for inserting data item $d_{50}$ into a bucket 210 of the hash table. Of course, while inserting new data items into a hash table comprising more than one entry per bucket (i.e., c>1), a decision tree 200 may inspect an exponentially increasing number of buckets after each search iteration, particularly if a data item is moved for each search iteration performed.

In embodiments where the number of moves during an insert operation is limited to k, the depth of the decision tree 200 may be limited to k+1, in which case up to $2(c^{k+1}-1)$ buckets may be inspected. In this case, the probability that a data item cannot be inserted in a hash table is equal to the probability that all $2(c^{k+1}-1)$ buckets are full (i.e., each bucket contains c data items). If there are a total of n data items stored in a hash table comprising m buckets (i.e., load factor=n/m), the probability that a single bucket is full will be equal to $(n/m)^c$, and the probability that all $2(c^{k+1}-1)$ buckets are full will be equal to $(n/m)^{(2(c^{\wedge}(k+1)-1))c}$.

Figure 3:
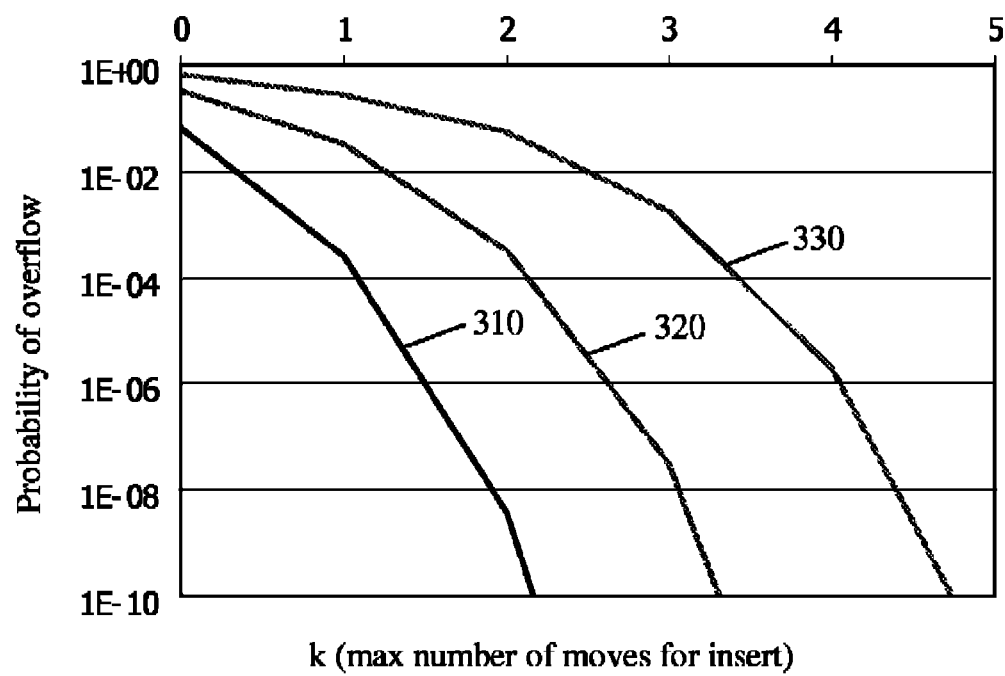
FIG. 3 is a waveform diagram illustrating the probability of an overflow during insert operations at different loads.
Figure 4:
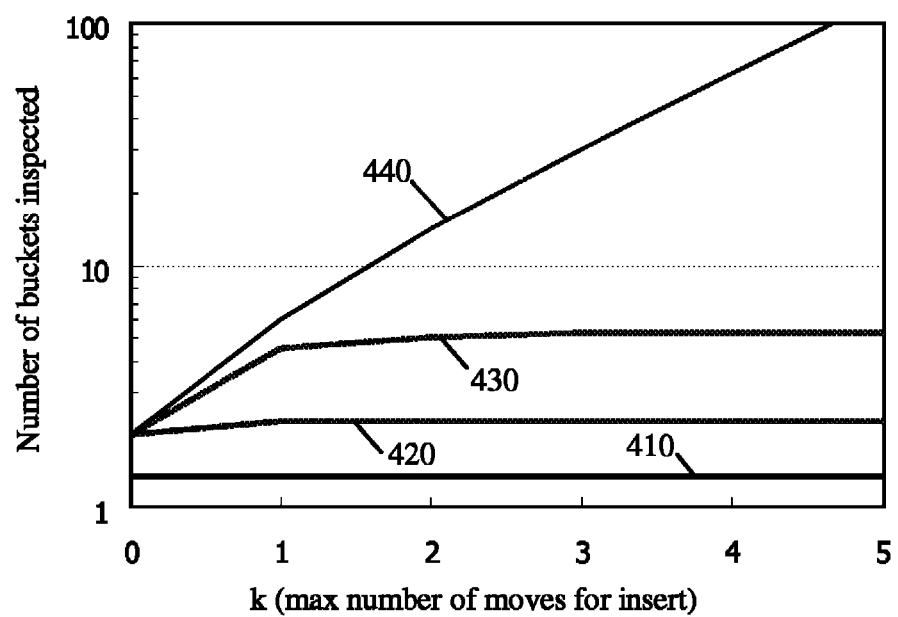
FIG. 4 is a waveform diagram of illustrating the number of buckets inspected per insert operation at different loads.

FIGS. 3 and 4 illustrate waveform diagrams based on different k values and load levels (n/m) for a hash table comprising m buckets, where each bucket is capable of storing two data items (i.e., c=2). The waveform diagrams were generated using the insertion and remapping algorithms disclosed herein. Referring first to FIG. 3, a waveform diagram 300 plots the probability of an overflow occurring (i.e., a data item cannot be inserted into a bucket) at different loads. For instance, signals 310, 320, and 330 indicate the probability of an overflow occurring when the hash table comprises a load factor equal to 50%, 75%, and 90%, respectively.

The waveform diagram 300 in FIG. 3 also indicates the maximum number of data items to be moved during an insertion operation at different load levels. According to signal 310, for example, when the hash table comprises a load factor equal to 50%, the maximum number of data items that might need to be moved for inserting a newly arrived data item is equal to about two. Similarly, signal 320 indicates that when the hash table comprises a load factor equal to 75%, the maximum number moves for inserting a newly arrived data item is equal to about three. Signal 330 indicates that when the hash table comprises a load factor equal to 90%, the maximum number of moves to insert a new data item is less than five.

Referring now to FIG. 4, a waveform diagram 400 plots the average number of buckets inspected during an insert operation at a given load, as well as the maximum number of buckets inspected at all loads. The waveform diagram 400 indicates that the average number of buckets (e.g., as indicated by signals 410, 420, and 430) inspected during an insert operation is noticeably lower than the maximum number of buckets (signal 440) inspected during an insert operation. Thus, it can be seen that there is a high probability that an available bucket will be found during the earlier stages of a decision tree (e.g., before reaching the leaf of the decision tree). Since the probability that a bucket is full is $p=(n/m)^c$, the probability that the i-th bucket will be inspected during an insert operation is equal to the probability that i−1 buckets inspected previously are all full, which is equal to $p^{i-1}$. In addition, the probability that a data item is inserted into the i-th bucket in such case is equal to $(1-p) \times p^{i-1}$. Thus, the average number of buckets inspected will be equal to $\Sigma i \times p^{i-1} \times (1-p)$. For larger search tree depths, this calculation can be approximated to $1/(1-p)$. Accordingly, for a hash table where each bucket is capable of storing two data items (i.e., c=2), the average number of buckets inspected for an insert operation will be equal to 1.33 for a load factor of 50% (signal 410), 2.286 for a load factor of 75% (signal 420), and 5.263 for a load factor of 90% (signal 430).

The examples described above illustrate that a hash table according to the present disclosure is capable of supporting relatively high and deterministic lookup rates, as only two buckets are inspected per lookup operation. In addition, it can also be seen that a hash table as described herein requires a reasonably low number of bucket inspections and data item movements during insertion operations, thereby enabling high insert and update rates. These rates may be optimized by selecting certain configuration values associated with the hash table, such as c and k. For instance, the present examples illustrate that setting bucket sizes to two data items per bucket (i.e., c=2) is generally sufficient to achieve a high load. As such, buckets may remain relatively narrow in size, and thus, require relatively low memory bandwidth. Furthermore, based on the data and examples disclosed herein, it can be seen that at load levels near 90%, limiting the maximum number of data items moved per insertion to eight (i.e., k=8) will result in near guaranteed insertions. In other words, insert operations will require at most eight moves to provide guaranteed hash table update performance.

In some embodiments, a hash table may store fingerprints in its buckets rather than storing an entire key, in which case the complete key values may be maintained in another table. For instance, the use of fingerprints may be employed to further reduce memory bandwidth, such as when storing long text strings. However, relatively small fingerprints may lead to fingerprint collisions and a high false positive rate (FPR), thereby resulting in non-deterministic behavior. In one aspect, therefore, it may be assumed that either an entire key or a sufficiently large fingerprint is stored, so as to ensure a near zero fingerprint collision rate and FPR. For example, a 128-bit fingerprint may have a FPR and fingerprint collision rate of roughly $2^{-64}$, which for all practical purposes is highly unlikely to occur.

Figure 5:
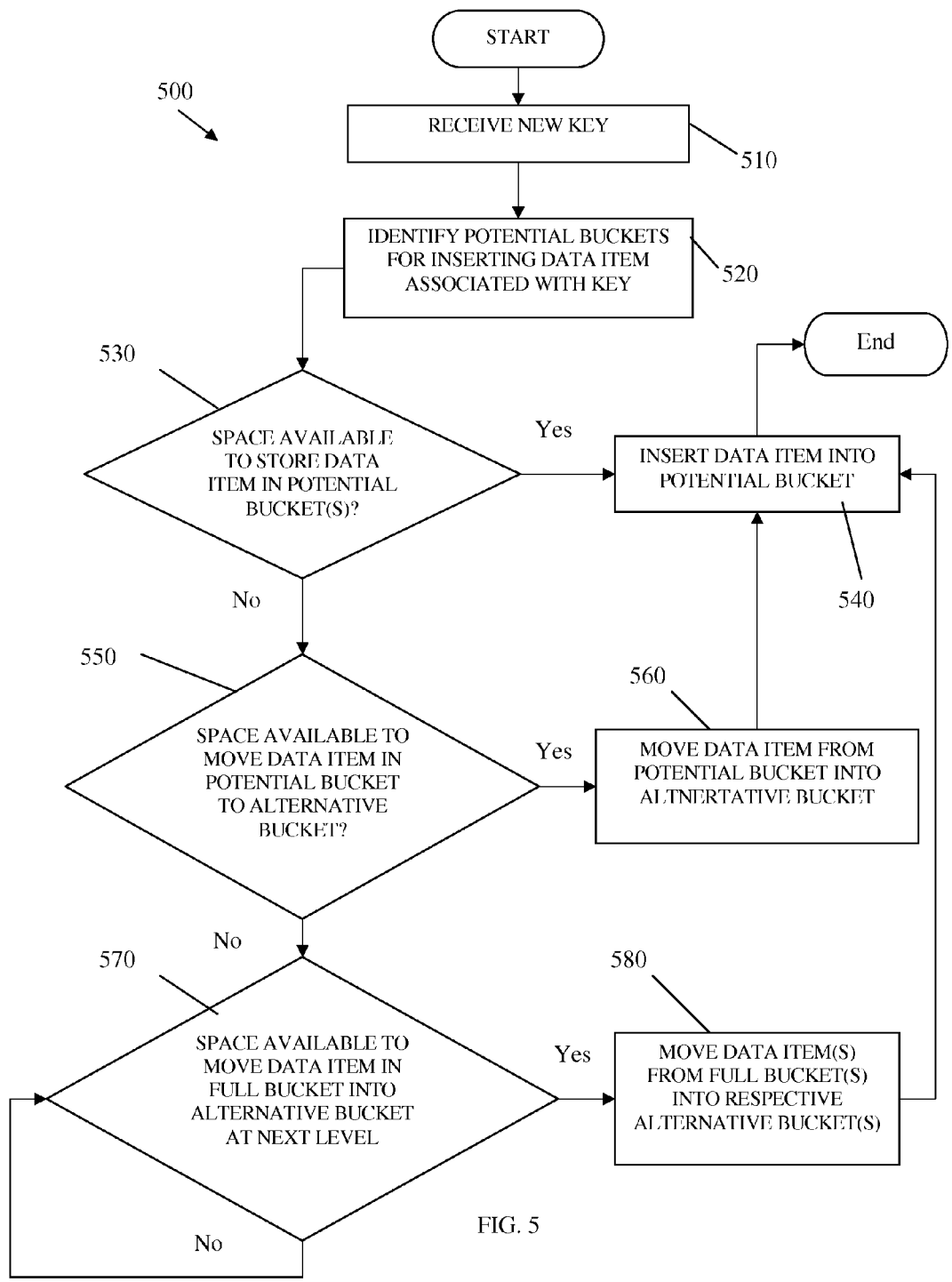
FIG. 5 is a flowchart of a method for inserting data items into a hash table according to an embodiment of the present disclosure.

FIG. 5 illustrates an embodiment of a method 500 for inserting data items in a hash table comprising a plurality of buckets, where each bucket is capable of storing at least two data items. The method 500 may be implemented by any suitable network component such as a router or a switch. The method 500 may begin at block 510, where a key is received. At block 520, at least two potential buckets for inserting the data item associated with the key are determined. The potential buckets may be determined by applying two different hashes to the key. At block 530, it is determined whether either of the two potential buckets have space available to store the data item. If space is available, then, at block 540, the data item is inserted into one of the potential buckets having available space. If no space is available in the potential buckets, then method 500 proceeds to block 550 where alternative buckets to which data in the potential buckets may be moved are inspected to determine whether there is space available in the alternative buckets for moving a data item from one of the potential buckets. If the alternative bucket(s) have space available, then the method proceeds to block 560 and a data item from at least one of the potential buckets is moved to an alternative bucket, thereby freeing a potential bucket to receive the incoming data item associated with the new key. The method 500 then proceeds to block 540.

If the alternative buckets are full, then the method 500 proceeds to block 570 where it is determined whether alternative buckets at a next level in a hierarchical tree of alternative buckets has space available to store a data item. If the answer is no, then the method 500 repeats block 570 moving to the next lower level in the hierarchical tree of alternative buckets. If an alternative bucket is found that has space available to move the data item from the potential bucket, then the method 500 proceeds to block 580 and a data item from one of the potential buckets is moved to the alternative bucket.

The method 500 then proceeds to block 540 where the data item associated with the newly received key is inserted into the potential bucket.

Figure 6:
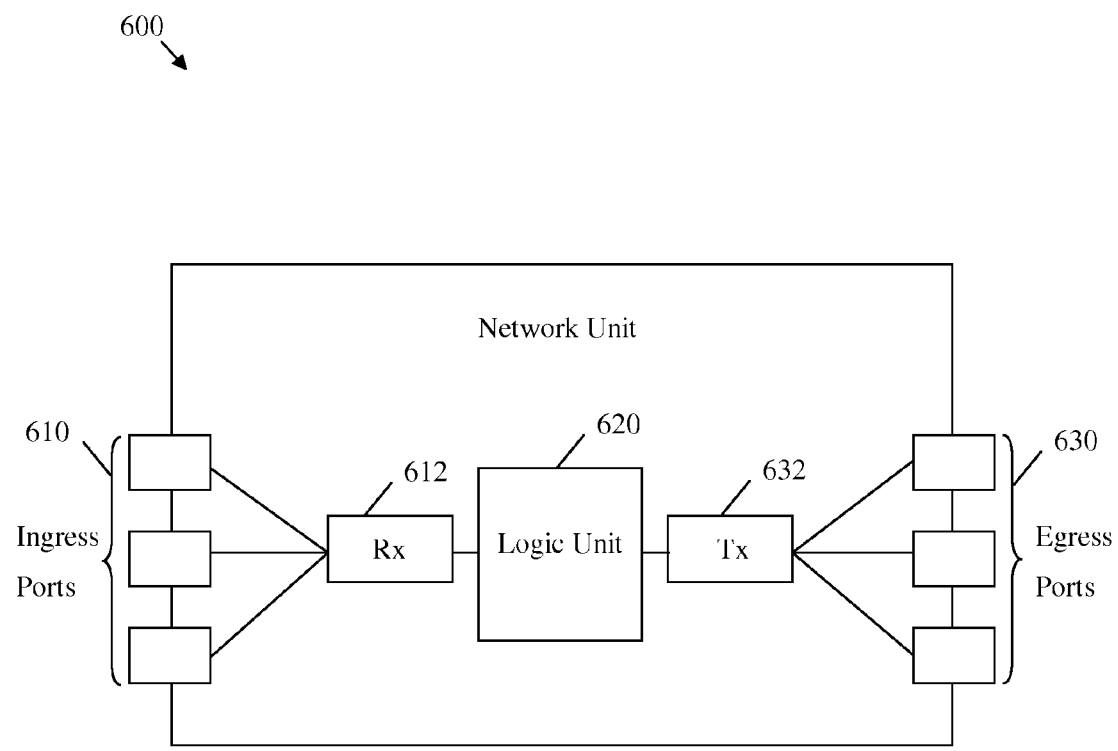
FIG. 6 is a schematic diagram of an embodiment of a network unit.

FIG. 6 illustrates an embodiment of a network unit 600, which may be any device or component that transports and processes data through a network. For instance, the network unit 600 may correspond to a router, bridge, or switch in a network. The network unit 600 may also comprise any suitable memory architecture. The network unit 600 may comprise one or more ingress ports or units 610 coupled to a receiver (Rx) 612 for receiving packets, objects, or Type Length Values (TLVs) from other network components. The network unit 600 may comprise a logic unit 620 to determine which network components to send the packets to. The logic unit 620 may be implemented using hardware, software, or both. The network unit 600 may also comprise one or more egress ports or units 630 coupled to a transmitter (Tx) 632 for transmitting frames to the other network components. The receiver 612, logic unit 620, and transmitter 632 may also be configured to implement or support the method 500. The components of the network unit 600 may be arranged as shown in FIG. 6, or according to any arrangement suitable for carrying out one or more operations disclosed herein. Furthermore, it is to be understood that some embodiments may include two or more network units 600.

Figure 7:
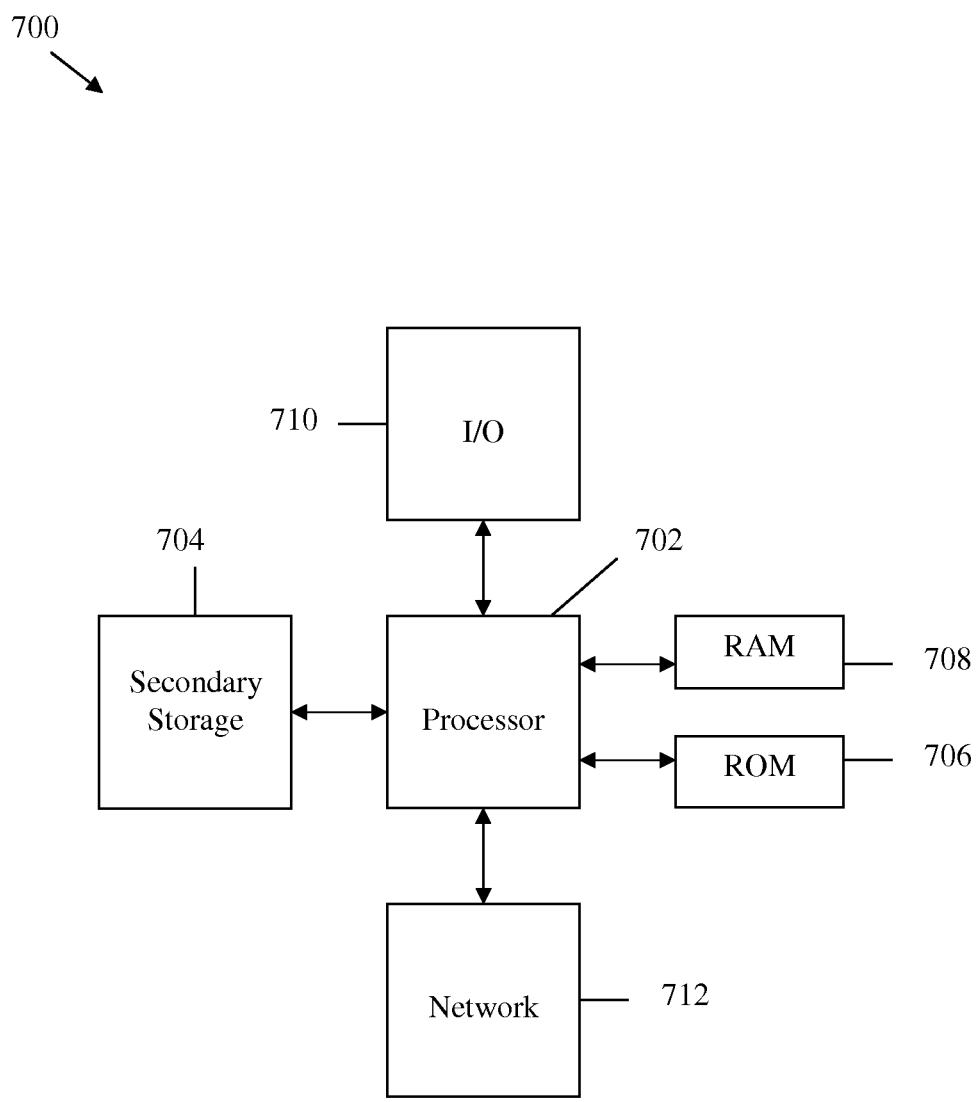
FIG. 7 is a schematic diagram of an embodiment of a general-purpose computer system.

The network components described above may be implemented in a system that comprises any general-purpose network component, such as a computer or network component with sufficient processing power, memory resources, and network throughput capability to handle the necessary workload placed upon it. FIG. 7 illustrates a typical, general-purpose network component 700 suitable for implementing one or more embodiments of the components disclosed herein. The network component 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips, or may be part of one or more Applications-Specific Integrated Circuits (ASICs).

The secondary storage 704 is typically comprised of one or more disk drives or tape drives and is used for non-volatile storage of data and as an overflow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

Having the benefit of the present disclosure, those skilled in the art will appreciate that the embodiments disclosed herein may be implemented to provide a hash table for associative lookup operations in high performance network equipment. Among other things, the hash table may be designed to satisfy the lookup and update throughput required in common network protocol implementations; to provide Denial-of-Service (DoS) resistant deterministic performance; store the required number of exact match lookup items; and economically utilize currently known and/or later developed memory technologies in router line cards.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 5, 4, etc.; greater than 0.10 includes 0.11, 0.12, 0.15, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 5 percent, 4 percent, 5 percent, . . . , 50 percent, 51 percent, 52 percent, . . . , 75 percent, 76 percent, 77 percent, 78 percent, 77 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a storage device comprising a hash table including a plurality of buckets, each bucket having a plurality of entries and being capable of storing a plurality of data items; and
a processor configured to:
apply at least a first and a second hash function upon receiving a key to generate a first index and a second index, respectively, the first and second indices identifying first and second potential buckets in the hash table for storing a new data item associated with the key;
determine whether at least one of the first and second potential buckets have space available in an empty entry to store the new data item; and
responsive to determining that at least one of the first and second potential buckets have available space, insert the new data item into one of the first or second potential buckets determined to have available space,
responsive to determining that at least one of the first and second potential buckets do not have available space, determining whether at least one alternative bucket has space available to store a data item currently stored in one of the first or second potential buckets, the at least one alternative bucket being selected from a first set of alternative buckets;
responsive to determining that an alternative bucket has available space:
moving a first data item from the first or second potential bucket to the alternative bucket; and
inserting the new data item into the first or second potential bucket from which the first data item was moved;
wherein responsive to determining that each of the first set of alternative buckets do not have available space to store data items currently located in the first and second potential buckets, the processor is further configured to determine whether at least one alternative bucket selected from a second set of alternative buckets has space available to store a data item currently stored in an alternative bucket determined not to have available space, and
wherein responsive to determining that a first alternative bucket from the second set of alternative buckets has space available, the processor is further configured to:
move a first data item from an alternative bucket determined not to have available space into the first alternative bucket;
move a second data item currently stored in one of the first or second potential buckets into the alternative bucket from which the first data item was moved; and
insert the new data item into the first or second potential bucket from which the second data item was moved.

2. The apparatus of claim 1, wherein the processor is configured to not insert the new data item into the hash table upon determining that the number of currently stored data items needed to be moved exceeds a predetermined threshold.

3. The apparatus of claim 1, wherein each data item currently stored in a bucket of the hash table has an alternative bucket, each alternative bucket corresponding to a potential bucket identified via the first or second hash function at the time of inserting each data item into the currently stored bucket, respectively.

4. A network apparatus implemented method for storing data into a hash table and implemented by at least one network component, wherein the hash table comprises a plurality of buckets and each bucket comprises a plurality of entries for storing data items, the method comprising:
receiving a first key;
applying, with a processor, a first hash function to the first key to generate a first index, the first index identifying a first potential bucket in the hash table for storing a new data item associated with the first key;
applying, with the processor, a second hash function to the first key to generate a second index, the second index identifying a second potential bucket in the hash table for storing the new data item;
determining, with the processor, whether at least one of the first and second potential buckets have space available in an empty entry to store the new data item; and
responsive to determining that at least one of the first and second potential buckets has available space, inserting the new data item into one of the first or second potential buckets determined to have available space;
responsive to determining that at least one of the first and second potential buckets do not have available space, determining whether at least one alternative bucket has space available to store a data item currently stored in one of the first or second potential buckets, the at least one alternative bucket being selected from a first set of alternative buckets;
responsive to determining that an alternative bucket has available space:
moving a first data item from the first or second potential bucket to the alternative bucket, and
inserting the new data item into the first or second potential bucket from which the first data item was moved;
responsive to determining that each of the first set of alternative buckets do not have available space to store a data item currently located in the first and second potential buckets, determining whether at least one alternative bucket selected from a second set of alternative buckets has space available to store a data item currently stored in an alternative bucket determined not to have available space;
responsive to determining that a first alternative bucket from the second set of alternative buckets has space available:
moving a first data item from an alternative bucket determined not to have available space into the first alternative bucket;
moving a second data item currently stored in one of the first or second potential buckets into the alternative bucket from which the first data item was moved; and
inserting the new data item into the first or second potential bucket from which the second data item was moved.

5. The method of claim 4, wherein the new data item is not inserted into the hash table if the number of currently stored data items needed to be moved exceeds a predetermined threshold.

6. The method of claim 4, wherein each data item currently stored in a bucket of the hash table has an alternative bucket, each alternative bucket corresponding to a potential bucket identified via the first or second hash function at the time of inserting each data item into the currently stored bucket, respectively.

7. An apparatus comprising:
a storage device comprising a plurality of buckets, wherein each bucket has a plurality of entries for storing a plurality of data items; and a processor configured to:
identify first and second potential buckets for storing a new data item by applying at least a first and a second hash function to a key associated with the new data item to generate a first index and a second index, respectively, wherein the first and second indices identify the first and second potential buckets in a hash table for storing the new data item associated with the key;
determine whether at least one of the first and second potential buckets have space available in an empty entry to store the new data item; and
determine whether at least one of a plurality of alternative buckets has space available to store a data item currently stored in one of the first or second potential buckets when both of the first and second potential buckets are full, wherein the plurality of alternative buckets are arranged in a hierarchical tree structure;
responsive to determining that an alternative bucket has available space:
move a first data item from the first or second potential bucket to the alternative bucket, and
insert the new data item into the first or second potential bucket from which the first data item was moved;
responsive to determining that each of the alternative buckets do not have available space to store a data item currently stored in the first and second potential buckets, determine whether at least one alternative bucket selected from a second set of alternative buckets has space available to store a data item currently stored in an alternative bucket determined not to have available space;
responsive to determining that a first alternative bucket from the second set has space available:
move a first data item from an alternative bucket determined not to have available space into the first alternative bucket;
move a second data item currently stored in one of the first or second potential buckets into the alternative bucket from which the first data item was moved; and
insert the new data item into the first or second potential bucket from which the second data item was moved.

8. The apparatus of claim 7, wherein the processor is further configured, responsive to determining that at least one of the first and second potential buckets have available space, to insert the new data item into one of the first or second potential buckets determined to have available space.

9. The apparatus of claim 7, wherein the processor is configured to not insert the new data item into a hash table upon determining that the number of currently stored data items needed to be moved exceeds a predetermined threshold.

10. The apparatus of claim 7, wherein each data item currently stored in a bucket of a hash table has an alternative bucket, each alternative bucket corresponding to a potential bucket identified via the first or second hash function at the time of inserting each data item into the currently stored bucket, respectively.

* * * * *